United States Patent
Roether et al.

(10) Patent No.: US 10,711,914 B2
(45) Date of Patent: Jul. 14, 2020

(54) TILTING ARMATURE VALVE AND METHOD OF PRODUCING THE SAME

(71) Applicant: KNORR-BREMSE Systeme fuer Nutzfahrzeuge GmbH, Munich (DE)

(72) Inventors: Friedbert Roether, Cleebronn (DE); Markus Deeg, Eberdingen (DE); Stefan Niedermeier, Haarbach (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 15/468,478

(22) Filed: Mar. 24, 2017

(65) Prior Publication Data
US 2019/0360609 A1 Nov. 28, 2019

(30) Foreign Application Priority Data
Mar. 24, 2016 (DE) .......................... 10 2016 105 532

(51) Int. Cl.
*F16K 31/06* (2006.01)
*F16K 1/22* (2006.01)

(52) U.S. Cl.
CPC .......... *F16K 31/0682* (2013.01); *F16K 1/221* (2013.01); *F16K 1/225* (2013.01)

(58) Field of Classification Search
CPC ............. F16K 31/0655; F16K 31/0682; F16K 31/0679; F16K 1/221; F16K 1/225; F16K 1/42; H01F 7/14; B60T 13/665; B60T 31/683; B60T 15/027; B60T 17/228

USPC .......................................... 251/129.16, 129.2
See application file for complete search history.

(56) References Cited

U.S. PATENT DOCUMENTS

| | | | |
|---|---|---|---|
| 5,040,567 A * | 8/1991 | Nestler .................. | F16K 11/04 137/625.44 |
| 5,139,226 A | 8/1992 | Baldwin et al. | |
| 5,762,097 A * | 6/1998 | Hettinger ............ | F16K 31/0682 137/270 |
| 7,252,114 B2 * | 8/2007 | Wygnanski ......... | F16K 31/0682 137/625.44 |
| 7,857,283 B2 * | 12/2010 | Gaiardo .............. | F16K 31/0682 251/129.16 |
| 8,757,588 B2 * | 6/2014 | Scheibe ................ | F16K 11/044 251/129.16 |

(Continued)

FOREIGN PATENT DOCUMENTS

| | | |
|---|---|---|
| DE | 202010006187 U1 | 8/2010 |
| DE | 102014115206 B3 | 2/2016 |

(Continued)

*Primary Examiner* — Matthew W Jellett
(74) *Attorney, Agent, or Firm* — Norton Rose Fulbright US LLP; Gerard Messina

(57) ABSTRACT

The present invention relates to a tilting armature valve included at least a coil element having at least one coil core and a coil arranged radially around the coil core. The tilting armature valve may further include an armature mounted on a face side of the armature by means of a bearing. Furthermore, the tilting armature valve may include a sealing element arranged on the side of the armature facing the coil element or facing away therefrom. Moreover, the tilting armature valve may include a valve seat having an outlet and an inlet for a fluid, wherein the outlet is closable in a fluid-tight manner by way of the sealing element.

22 Claims, 3 Drawing Sheets

(56) References Cited

U.S. PATENT DOCUMENTS

| | | | | |
|---|---|---|---|---|
| 10,024,452 B2* | 7/2018 | Ohki | ............... | F16K 31/06 |
| 10,119,625 B2* | 11/2018 | Ohki | ............... | H01F 7/14 |
| 2008/0149192 A1 | 6/2008 | Holec et al. | | |

FOREIGN PATENT DOCUMENTS

| | | |
|---|---|---|
| DE | 102014115207 A1 | 4/2016 |
| EP | 1353102 A2 | 10/2003 |
| EP | 2383458 A2 | 11/2011 |
| JP | S58175188 A | 10/1983 |
| WO | 2004/027829 A2 | 4/2004 |

* cited by examiner

TILTING ARMATURE VALVE AND METHOD OF PRODUCING THE SAME

RELATED APPLICATION

The present application claims priority benefit of German Patent Application No. 10 2016 105 532.8, filed on Mar. 24, 2016. The entire contents of German Patent Application No. 10 2016 105 532.8 are hereby incorporated herein by reference.

FIELD OF THE DISCLOSURE

The present invention relates to a tilting armature valve as well as to a method of producing the same.

BACKGROUND OF THE DISCLOSURE

In tilting armature valves, the tilting armature often is mounted by means of a needle bearing. This needle bearing protrudes from a housing of the tilting armature valve, for example, and fixes an axis about which the armature can move. Often, also lateral fixing this axis about which the armature can move is required to make the mounting of the movable tilting armature as simple as possible. However, this requires many small components, the mounting of which increases the cost of the tilting armature valve to be produced in this way and also is detrimental to the robustness of the tilting armature valve.

Hence, at least one described implementation provides a possibility for improving the robustness and reducing the manufacturing cost of a tilting armature valve as well as for low-wear operation of a tilting armature valve.

SUMMARY

The approach presented here provides a tilting armature valve, in particular for a pressure regulating module of a vehicle, wherein the tilting armature valve comprises at least: a coil element having at least one coil core and a coil arranged radially around the coil core; an armature mounted on a face side of the armature by means of a bearing, wherein the armature is movable from a first position to a second position, in particular by applying a current to the coil, wherein the bearing is formed by a bump in a bearing portion of the armature or in the coil element; a sealing element arranged on the side of the armature facing the coil element or facing away therefrom; and a valve seat having an outlet and an inlet for a fluid, wherein the outlet is closable in a fluid-tight manner by means of the sealing element in the first position of the armature and/or wherein the outlet is released in the second position of the armature, in particular wherein the valve seat is arranged on a side facing the coil element or facing away therefrom with respect to the armature.

A vehicle may be a vehicle having an electronic or pneumatic service brake system. A vehicle may be a commercial vehicle or a rail vehicle. The vehicle may comprise a pressure regulating module. The pressure regulating module may be part of the electronic service brake system. The bump may have a suitable shape, for example a B shaped to be at least partially round.

The coil element may comprise an interface for receiving a control signal. The coil element may be configured to generate a magnetic field when a control signal is applied or in response to the control signal. The tilting armature valve may be configured to guide fluid present at the inlet to the outlet. Herein, fluid flow may be controlled by way of the position of the armature. Advantageously, the tilting armature valve may be employed as a shutter inlet/outlet valve, as an opener for example for a backup application or universal use as a changer or a shuttle valve.

A bearing portion may be a portion of the armature. A bump may be a protrusion or a bulge protruding in the bearing portion from a main plane of extension of the armature. The bump may be formed by a ball arranged, glued or pressed into the bearing portion, for example. However, it is also possible for the bump to be formed by a stamping step, for example by pushing a stamp from one side onto the armature in the bearing portion and hereby forming a bump on the opposite side. The bump may be at least partially round so that minimum sliding resistance when material slides over the bump is obtained when the armature moves. However, it is also possible for the at least one bump to be arranged in the coil element, for example on a side facing the armature. The at least one bump may also be produced by injection moulding, for example in form of an injection-moulded plastic bump or plastic ball, over a main surface of the armature or the housing of the coil element.

The approach of an embodiment for the tilting armature proposed here is based on the finding that, by using the bump the bearing portion of the armature, a very easy-to-produce and robust possibility for moving the armature is provided. Herein, the armature may be moved without great sliding resistance by rolling over the bump on a side opposite from the bump. The approach proposed here offers the advantage that the bump in the bearing portion of the armature can be produced in a technically very simple and inexpensive way and also offers a robust and little error-prone possibility of ensuring the mobility of the armature.

What is also possible is an embodiment of the approach proposed here, wherein the bump is arranged on a side of the bearing portion of the armature facing the coil. Such an embodiment of the approach proposed here offers the advantage that a clearance that can be used as a space for movement of the armature can be provided by the bump between the coil and the armature. In this respect, it is possible to provide a space for movement of the armature in a way that is very easy to realise technically.

In another embodiment of the approach presented here, the bump may also be formed to guide a movement of the armature in an axial direction to the coil element of the tilting armature valve.

According to another embodiment of the approach proposed here, the bump may at least partially have a spherical shape or a spherical cap shape. Such an embodiment of the approach proposed here offers the advantage that the bump can be formed very easily, for example in form of an at least partially spherical or spherical-cap-shaped stamp which is pressed into the armature from a side in the region of the bearing portion and hereby forms the bump on the opposite side, and/or that prefabricated balls, for example of metal, preferably steel, may be embedded into the armature the bearing portion.

What is particularly advantageous is a further embodiment of the approach proposed here, wherein at least a further, for example at least partially round bump is provided in the bearing portion. The at least one further bump may be formed to be analogous or similar with respect to the bump already mentioned. Such an embodiment of the approach proposed here offers the advantage that the mobility of the armature can be limited to a preferred direction by at least two bumps so that both the fault liability of such a tilting armature valve can be reduced and the manufacturing cost is not increased significantly.

In particular, the further bump may be arranged on a side of the bearing portion of the armature facing the coil or facing away therefrom and/or at least partially have spherical shape or spherical cap shape. A robust tilting armature valve in which a preferred direction of movement of the armature is ensured can also be provided by such an embodiment of the approach presented here using technically simple means.

The armature of the tilting armature valve can be moved in and especially way if the bump and the further bump are oriented towards each other in a direction forming a rotational axis of the armature, according to an embodiment of the approach presented here.

What is also possible is an embodiment of the approach proposed here, wherein the bump and/or the further bump is formed by a ball introduced into the bearing portion of the armature, in particular wherein the ball is pressed and/or moulded into the bearing portion of the armature. For example, such a ball may be pressed into an omega-shaped recess in the material of the armature. Such an embodiment of the approach proposed here offers the advantage that the ball comprises another material than that of the armature, for example a metal, in particular steel, and hereby causes particularly little wear and/or friction concerning the mobility of the armature. Furthermore, such a ball can be produced by technically simple means, whereby such a ball is inexpensively available and also technically simple and may thus be introduced into the armature in an inexpensive way.

What is particularly robust and immune to errors is embodiment of the approach proposed here in which a housing is provided, wherein a housing portion of the housing of the tilting armature valve opposite from the bump comprises a recess for accommodating the bump, in particular wherein the housing portion at least partially encompasses or accommodates the coil. In this way, the bump may be fixed locally, whereby wrong movement of the armature is largely prevented, and thus malfunction of the tilting armature valve can be minimised or completely excluded.

What is also advantageous is an embodiment of the approach presented here, wherein the housing the tilting armature valve is formed to be substantially cylindrical. Such an embodiment offers the advantage of a very compact, yet robust design of the tilting armature valve.

According to another embodiment the approach proposed here, the tilting armature valve may comprise a spring for pressing the at least one bump against the coil element or a housing of the coil element, in particular wherein the spring is a leaf spring. Such an embodiment the approach proposed here offers the advantage that the armature may be securely held in a defined initial position using the spring, or the armature substantially only slides over the bump upon movement of the armature. In this way, malfunction of the tilting armature valve also may largely be avoided. What is also possible is that the spring effects lateral guidance of the armature, in particular without enclosing the armature. In this way, the spring may prevent the armature from slipping in a direction lateral with respect to the coil element.

An embodiment of the approach presented here in which the spring is arranged on a side of the armature opposite the coil can be produced in a technically particularly easy way. In this manner, the tilting armature valve can be produced in a technically very simple way with respect to the assembly of components.

What is also advantageous is embodiment of the approach presented here as a producing a tilting armature valve according to one of the embodiments proposed here, wherein the method comprises the steps of: providing a coil element having at least a coil core and a coil arranged radially around the coil core, an armature mounted by means of a bearing on a face side of the armature, wherein the bearing is formed by an exemplarily at least partially round bump in a bearing portion of the armature, a sealing element and a cover shell in which a valve seat is formed with an outlet and an inlet for a fluid; and mounting the coil element, the armature, the sealing element and the cover shell such that the armature is movable from a first position to a second position, in particular by applying a current to the coil, the sealing element is arranged on the side of the armature facing away from the coil element, and the outlet is closable in a fluid-tight manner by means of the sealing element in the first position of the armature and/or the outlet is released in the second position of the armature.

In one embodiment approach presented here also provides a method of operating a variant of a tilting armature valve presented here, wherein the method comprises the step of: applying a current to the coil of the coil element in order to move the armature from the first position to the second position.

The approach presented here also provides a controller configured to execute, control or perform, in corresponding units, the steps of a variant of a method presented here. The object underlying the invention may be achieved quickly and efficiently also by this embodiment of the invention in form of a controller.

To this end, the controller may comprise at least one processing unit for processing signals or data, at least one storage unit for storing signals or data, at least one interface to the sensor or an actuator reading sensor signals from the sensor or for outputting control signals to the actuator and/or at least one communication interface for reading or outputting data embedded in a communication protocol. The processing unit may, for example, be a signal processor, a microcontroller or the like, wherein the storage unit may be a flash memory, an EPROM or a magnetic storage unit. The communication interface may be configured to read or output data in a wireless and/or wired manner, wherein a communication interface capable of reading or outputting data via a line may read this data electrically or optically from a corresponding data transmission line or output the same into a corresponding data transmission line, for example.

A controller may be a technical device processing sensor signals and outputting control and/or data signals depending thereon. The controller may comprise an interface, which may be configured as hardware and/or software. If configured as hardware, the interfaces may, for example, be part of a so-called system ASIC including various functions of the controller. However, it is also possible for the interfaces to be discrete integrated circuits or at least partly consist of discrete components. If configured as software, the interfaces may be software modules present on a microcontroller along with other software modules, for example.

What is also advantageous is a computer program product or to program with program code which may be stored on a machine-readable carrier or storage medium, such as a semiconductor memory, a hard-drive memory or an optical memory, and is used for executing, performing/controlling the steps of the method according to one of the embodiments previously described, in particular when the program product or program is executed on a computer or a device.

What is also advantageous is an embodiment of the approach presented here, wherein the spring is formed to laterally guide the armature and/or hold the armature in a predetermined position. Such an embodiment offers the advantage of advantageous multiple use of the spring.

According to another embodiment, a guiding element for axially guiding the armature in a direction between a housing cover and the coil element may also be provided, in particular wherein the guiding element is formed as a needle bearing. By means of such an embodiment, the armature can be axially mounted very securely.

What is also possible is an embodiment of the approach presented here, wherein the valve seat is formed as a multipart element, in particular wherein the elements of the valve seat have been fixed to each other prior to start-up of the tilting armature valve. Hereby, for example, a multipart nozzle enabling precise adjustment of the location of the armature of the tilting armature valve may be formed in the region of the valve seat.

Alternatively or additionally, in a further embodiment, the sealing element may be usable as a damping element, and/or the sealing element may have been attached on the armature by means of a vulcanisation method, and/or the armature may be formed as a damper or sealing element. The tilting armature valve to be produced may also be produced in a technically very simple, yet reliable manner by way of such an embodiment of the approach presented here.

BRIEF DESCRIPTION OF THE DRAWINGS

Preferred embodiments of the present invention will be explained in greater detail with reference to the appended drawings, in which.

DETAILED DESCRIPTION

Figure 1A:
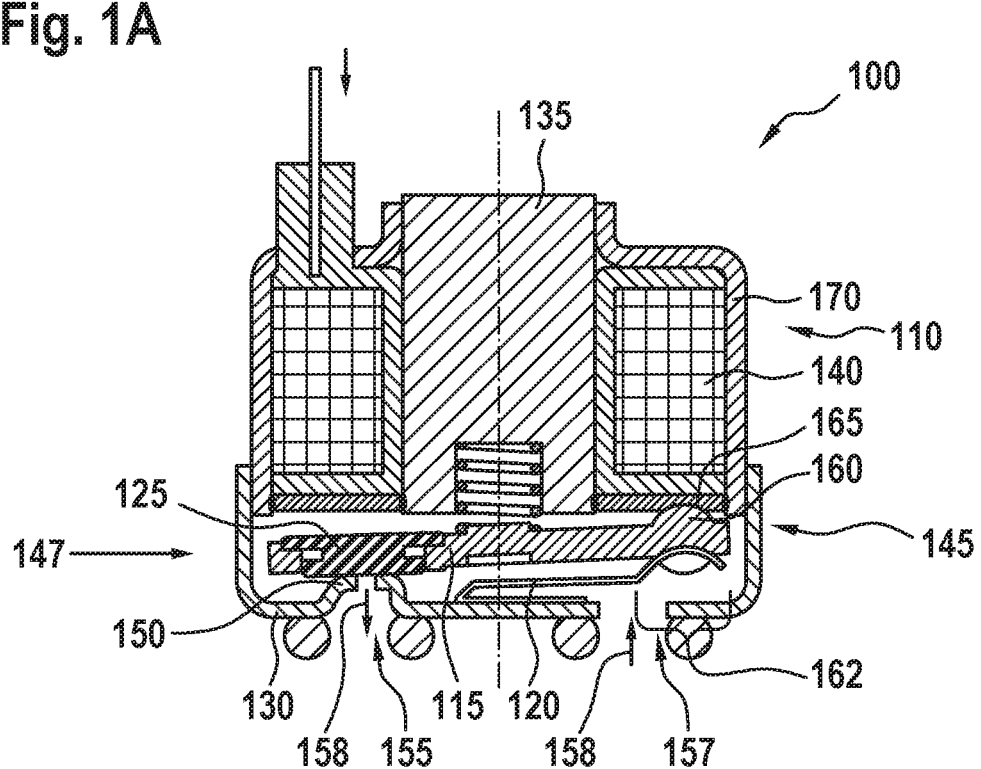
FIG. 1A shows a cross-sectional illustration through a tilting armature valve according to an embodiment of the present invention, wherein the armature is in the first position.

In the following description of advantageous embodiments of the present invention, the same or similar reference numerals shall be used for the elements depicted in the various figures and acting in a similar way, wherein repeated description of these elements shall be omitted.

FIG. 1A shows a cross-sectional illustration through a tilting armature valve 100 according to an embodiment of the present invention, wherein the armature is in the first position. The tilting armature valve 100 comprises a coil element 110, and armature 115, a spring 120, a sealing element 125 and a cover shell 130. The coil element 110 includes at least one coil core 135 and a coil 140 arranged radially around the coil core 135. A face side of the armature 115 is mounted by means of a bearing 145. The armature is movable between a first position 147 and a second position 149. The armature 115 is configured to be moved from the first position 147 to the second position 149 upon activation of the coil 140. With the coil 135 activated, the armature 115 can be held in the second position 149. The sealing element 125 is arranged on the side of the armature 115 facing away from the coil element 110. A valve seat 150 having an outlet 155 and an inlet 157 for a fluid 158 is formed in the cover shell 130. Herein, the outlet 155 is closable in a fluid-tight manner by means of the sealing element 125 when the armature 115 is arranged in the first position 147. Herein, the sealing element 125 May also act as a damping element in order to prevent the armature 115 from impacting on the valve seat 150. Herein, the sealing element 125 may be attached on the armature 115 or a carrier element by vulcanising. It is also possible that an angle for the impact of the armature 115 or the sealing element 125 onto the valve seat 150 is produced by a slanting nozzle or an obliquely formed sealing element 125 or a curved armature 115. Such a nozzle, which is not explicitly shown in FIG. 1A, does not necessarily have to be integrated into the tilting armature valve 100, but may also be provided by external housing components.

It is also possible for the valve seat 152 be arranged in the coil element 110, which is not explicitly illustrated in FIG. 1A for reasons of clarity, however. In this case, what would be advantageous is an actuator effecting clearance of the outlet by the armature 115.

The armature 115 comprises at least one at least partially round bump 160 in a bearing portion 162, wherein the bump 160 advantageously engages a recess 165 or opening arranged in a portion of the housing 170 of the tilting armature valve 100 opposite from the bump 160. Hereby, when moving from the first position 147 to the second position 149 after a current flow through the coil 140 has been turned on, the armature 115 may glide in the recess and also is held in a fixed position in the housing 170 or with respect to the cover shell 130. Advantageously, the recess is formed to be trapezoidal so that minimum friction is caused when the bump glides across the surface of the recess 165. The recess 165 may be made of a plastic material, for example, and hereby be producible very easily and inexpensively.

In the embodiment illustrated in FIG. 1A the bump 160 is shaped as a ball pressed or glued into the material of the armature 115 in the bearing portion 162 of the bearing 145. It is also possible for the ball to be welded with the material of the armature 115 in the bearing portion 162. Hereby, a very strong connection of the ball to the armature 115 is achieved. The ball may be made of metal, for example steel, and/or comprise another material than the armature 115. To this end, the material of the ball may be chosen following a criterion of minimum wear, whereas the material of the armature 115 may be chosen following a criterion of optimum or maximum magnetic flux. However, it is also possible for the bump 162 be formed only by one-sided embossing into the material of the armature 115 instead of a ball. Hereby, discrete embedding of a ball into the material of the armature 115 can be omitted, and yet an at least partially round bump fulfilling the same functions as a ball can be formed over a surface of the armature 115. There may also be provided two balls arranged next to each other, which will be explained in greater detail in the following.

In this embodiment, the spring 120 is configured as a leaf spring and arranged in the bearing portion on a side of the armature 115 opposite the coil 140. Herein, the spring 120 serves for free-of-clearance pushing of the bearing ball(s)

pressed in the armature 115 into the (for example trapezoidal) counter-shell or recess 165 in the housing 170 of the coil element 110. The armature 115 may be fixed by the spring 120 so that the armature 115 is held in a predetermined position by the spring 120. This offers the advantage that a constant preloading force can be exerted on the armature 115 and the force exerted by the spring 120 on the armature 115 can be introduced as closely as possible to a force application point to the armature 115 on the rotational axis.

As an alternative, the armature 115 may be hinged on the coil element 110. In this case, the spring 120, which is configured as a leaf spring, for example, may be omitted.

What is also possible is an embodiment of the approach presented here in which a needle bearing not shown in FIG. 1A can be used for realising lateral guidance of the armature 115. In this way, very stable guidance of the armature 115 can be achieved.

As opposed to designs of tilting armature valves in which the region exposed to the medium is separated from the region in which the magnetic flux is built up, the design illustrated here has a dual function. The region around the armature 115 is sealed and separates the regions exposed to the medium. These regions also conduct the magnetic flux.

Figure 1B:
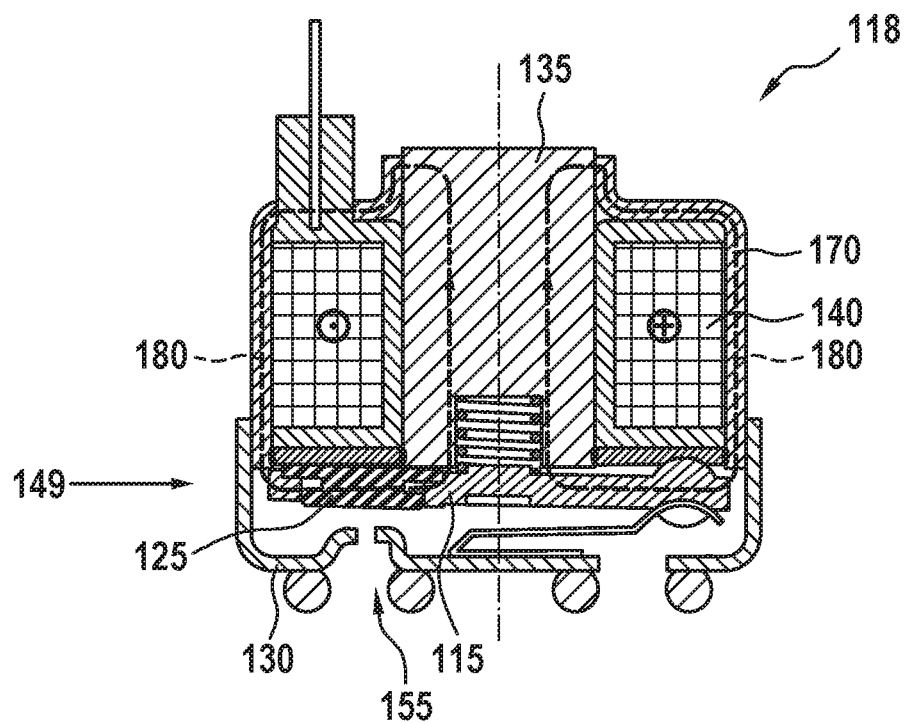
FIG. 1B shows a cross-sectional illustration through a tilting armature valve according to an embodiment of the present invention, wherein the armature is in the second position.

FIG. 1B shows a cross-sectional illustration through a tilting armature valve 100 according to an embodiment of the present invention, wherein the armature 115 is in the second position 149. In this case, a current through the coil 140 is turned on, and the armature 115 is tightened so that a magnetic field illustrated by the field lines 180 builds up. When the current through the coil 140 is turned off, the armature 115 may back into the first position 147 by way of gravity, for example.

By way of the magnetic force in the turned-on state of the coil 140, the bearing force on the bumps 160 is increased. In case of a not magnetised magnetic field, the bearing force may, however, the small because lateral forces are small too. In this case, the bearing of the armature 115 in the non-magnetised state be on a very low force level, which in turn is advantageous due to reduced wear.

Figure 2:
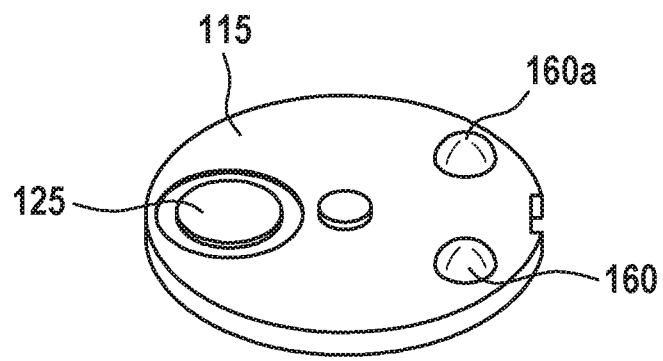
FIG. 2 shows a perspective view of an armature to be used in a tilting armature valve according to an embodiment of the present invention.

FIG. 2 shows a perspective illustration of an armature 115 for use in a tilting armature valve 100 according to an embodiment of the present invention. In this embodiment, in addition to the sealing element 125, the armature comprises several (here two) balls as bumps 160 and/or 160a, which are arranged in a direction forming a rotational axis of the armature 115 in the rotation after turning on the current through the coil 140. These balls as bumps 160 and/or 160a may, for example, each be pressed into an omega-shaped recess in the armature 115 with a constant force, for example, whereby both stress on the material when pressing the balls 160 and/or 160a into the armature 115 can be reduced and yet the balls can be held securely.

In summary, it is to be noted that, in contrast to conventional approaches, the approach presented here proposes a bearing requiring neither a needle bearing nor axial guidance of the needle bearing by a spring. Hereby, a complex spring can be omitted. In the approach presented here, the needle bearing is replaced by at least one bump in the armature 115, in particular by two bearing balls. Hereby, for example, to axial directions can be fixed, and axial guidance by the spring can be omitted. Hereby, more precise bearing of the armature 115 is possible also in the second axial direction.

In the concept presented herein with at least one bump 160, in particular to balls as bumps 160, a floating bearing of the armature 115 can no longer be realized, but a fixed bearing, thereby allowing for improved centring and lower magnetic lateral forces resulting therefrom and thus less wear of the bearing.

Another advantage of the approach presented here is that due to omission of the axial guidance in form of the needle bearing the bearing position may be placed within an exemplarily cylindrical housing 170 because of the spring. Significantly improved producibility of the housing 170 can be achieved thereby.

Furthermore, the approach presented here is advantageous because hereby a method of economical production of the armature becomes possible, because the balls can be pressed in and fixed into place or the bump can be pressed or stamped into the armature directly in the stamping process.

Furthermore, it is advantageous if the coil body is designed such that the recesses 165 arranged in the plastics of the coil body or coil element 110 or its housing 170 as bearing positions are formed to be trapezoidal. Moreover, it is advantageous if one of the counter-bearing positions of the balls is formed as an elongated hole. Thereby, the tolerance deviation from the distance of the two balls as bumps 160 can be compensated for, i.e. one ball then fixes the second axis. The first axis then passes through both balls.

In contrast to conventional approaches in which for example a spring enclosing the armature and having several functions at the same time is used, it is advantageous to use two springs, for example one spring for each remaining function. According to the approach presented here, the armature 115 can be mounted free of clearance by means of one of the remaining springs if the spring 120 engages between the bearing positions or bump(s) 160. This spring 120 may be configured as a leaf spring introducing its force centrally between the bearing balls as bumps 160, for example. Alternatively, two coil springs directly acting on the bearing balls as bumps 160, for example, are possible. This means that the bearing balls as bumps 160 serve both as bearing positions and spring seats. In particular, an embodiment of the present invention as a tilting armature valve with ball bearing is presented herein.

Figure 3:
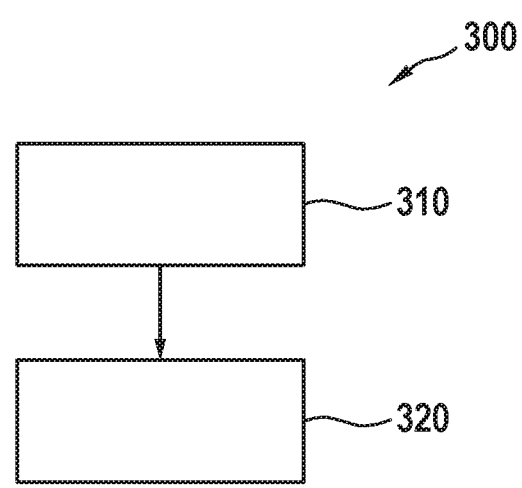
FIG. 3 shows a flowchart of a method of producing according to an embodiment of the present invention.

FIG. 3 shows a flowchart of a method 300 of producing according to an embodiment of the present invention. The method 300 of producing a tilting armature valve 100 according to a variant presented here comprises a step 310 of providing a coil element having at least a coil core and a coil arranged radially around the coil core, an armature mounted on a face side of the armature by means of the bearing, wherein the bearing is formed by at least partially round bump in bearing portion of the armature, a sealing element and a cover shell in which a valve seat with an outlet and an inlet for a fluid is formed. Furthermore, the method 300 of producing comprises a step 320 mounting the coil element, the armature, the sealing element and the cover shell such that the armature is movable from a first position to a second position, particularly by applying a current to the coil, the sealing element is arranged on the side of the armature facing away from the coil element and the outlet is closable in a fluid-tight manner in the first position of the armature by means of the sealing element and/or the outlet is released in the second position of the armature.

Figure 4:
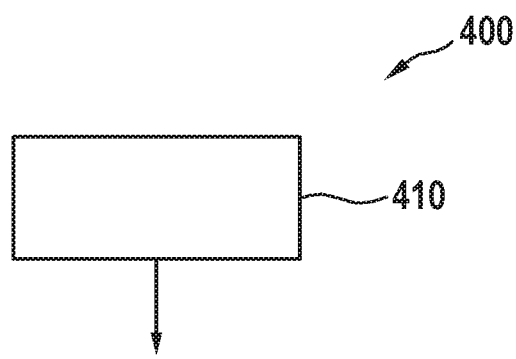
FIG. 4 shows a flowchart of a method of operating according to an embodiment of the present invention.

FIG. 4 shows a flowchart of a method 400 of operating a tilting armature valve 100 according to a variant presented here. The method 400 of operating a tilting armature valve 100 comprises a step 410 of applying a current to the coil of the coil element in order to move the armature from the first position to the second position.

Figure 5:
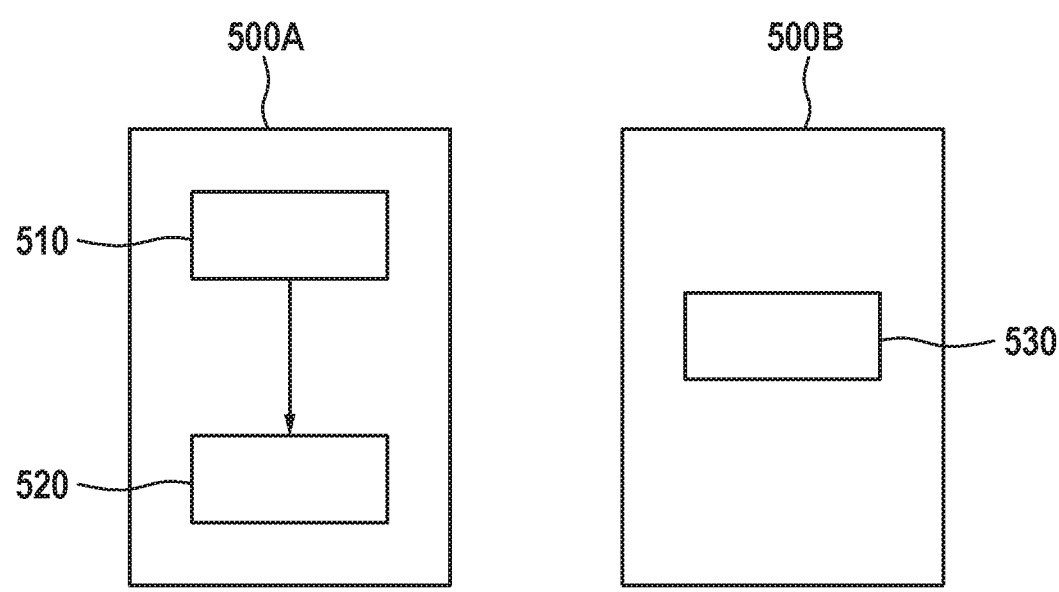
FIG. 5 shows a block diagram of an embodiment of the present invention as a controller.

FIG. 5 shows a block diagram each of an embodiment of the present invention as a controller 500A and/or 500 B. The controller 500A comprises a unit 510 for providing a coil element having at least a coil core and a coil arranged radially around the coil core, an armature mounted on a face side of the armature by means of the bearing, wherein the bearing is formed by at least partially round bump in bearing portion of the armature, a sealing element and a cover shell in which a valve seat with an outlet and an inlet for a fluid is formed. Furthermore, the controller 500 comprises a unit 520 for mounting the coil element, the armature, the sealing element and the cover shell such that the armature is movable from a first position to a second position, particularly by applying a current to the coil, the sealing element is arranged on the side of the armature facing away from the coil element and the outlet is closable in a fluid-tight manner in the first position of the armature by means of the sealing element and/or the outlet is released in the second position of the armature.

The controller 500B comprises a unit 530 for applying a current to the coil of the coil element in order to move the armature from the first position to the second position.

The rear side of the tilting armature valve 100 may be used both as a damper or as a sealing element, for example for 2/2 NO or for 3/2 solenoid valves. Hereby, the tilting armature valve 100 may be used advantageously as a subcomponent of diverse families of solenoid valves, whereby the flexibility of employment of the tilting armature valve 100 may be increased significantly.

As an advantage of the approach presented here as opposed to the use of a plunger, it may be mentioned that unhindered air guidance through the core or a region between the coil body and the core can be enabled.

The embodiments of a tilting armature valve and the method of producing and of operating the tilting armature valve presented here may be used for all applications, hydraulics, pneumatics, operating magnets, particularly for all applications in the field of vehicles, such as brakes, air suspensions, air-conditioning, transmissions and for variable magnet valves and for switchover valves.

We claim:

1. A tilting armature valve, comprising:
   a coil element having at least one coil core and a coil arranged radially around the coil core;
   an armature mounted on a face side of the armature by a bearing, wherein the armature is movable from a first position to a second position, and wherein the bearing is formed by a bump in a bearing portion of the armature or in the coil element;
   a sealing element arranged on the side of the armature facing the coil element or facing away therefrom;
   a valve seat having an outlet and an inlet for a fluid, wherein the outlet is closable in a fluid-tight manner by the sealing element in the first position of the armature, wherein the outlet is released in the second position of the armature, and wherein the valve seat is arranged on a side facing the coil element or facing away therefrom with respect to the armature;
   wherein the bump is represented by a ball incorporated into the bearing portion of the armature.

2. The tilting armature valve according to claim 1, wherein the bump is arranged on a side of the bearing portion of the armature, the bearing portion of the armature facing the coil.

3. The tilting armature valve according to claim 1, wherein the bump at least partially has a spherical shape or a spherical cap shape.

4. The tilting armature valve according to claim 1, comprising:
   at least one further bump in the bearing portion.

5. The tilting armature valve according to claim 4, wherein the at least one further bump is arranged on a side of the bearing portion of the armature, the bearing portion of the armature facing the coil, and/or wherein the at least one further bump at least partially has a spherical shape or spherical cap shape.

6. The tilting armature valve according to claim 4, wherein the bump and the further bump are oriented towards each other in a direction forming a rotational axis of the armature.

7. The tilting armature valve according to claim 4, wherein the ball is pressed and/or moulded into the bearing portion of the armature and/or wherein the introduced ball is introduced into a recess of the armature.

8. The tilting armature valve according to claim 1, wherein a portion of the housing of the tilting armature valve opposite from the bump includes a recess for accommodating the bump, and wherein the portion at least partially encompasses or accommodates the coil.

9. The tilting armature valve according to claim 1, comprising:
   a spring for pushing the at least one bump against the coil element or a housing of the tilting armature valve, and wherein the spring is formed as a leaf spring, leg spring or wire bending element.

10. The tilting armature valve per claim 9, wherein the spring is arranged on a side of the armature opposite from the coil.

11. The tilting armature valve according claim 9, wherein the spring is configured to laterally guide the armature and/or hold the armature in a predetermined position.

12. The tilting armature valve according to claim 1, comprising:
   a guiding element axially guiding the armature in a direction is provided between a housing cover and the coil element, and wherein the guiding element includes a needle bearing.

13. The tilting armature valve according to claim 1, wherein the valve seat is formed as a multipart element, and wherein the elements of the valve seat have been fixed to each other prior to start-up of the tilting armature valve.

14. The tilting armature valve according to claim 1, wherein the sealing element is usable as a damping element and/or wherein the sealing element has been attached on the armature by way of a vulcanisation method and/or wherein the armature is formed as a damper or sealing element.

15. A method of producing a tilting armature valve, the method comprising:
   providing a coil element having at least a coil core and a coil arranged radially around the coil core, an armature mounted by way of a bearing on a face side of the armature, wherein the bearing is formed by a bump in a bearing portion of the armature, a sealing element and a cover shell in which a valve seat is formed with an outlet and an inlet for a fluid;
   mounting the coil element, the armature, the sealing element and the cover shell such that the armature is movable from a first position to a second position, the sealing element is arranged on the side of the armature facing away from the coil element, and the outlet is closable in a fluid-tight manner by the sealing element in the first position of the armature and the outlet is released in the second position of the armature;
   wherein the bump is represented by a ball incorporated into the bearing portion of the armature.

16. The method according to claim 15, wherein the bump is arranged on a side of the bearing portion of the armature, the bearing portion of the armature facing the coil.

17. The method according to claim 15, wherein the bump at least partially has a spherical shape or a spherical cap shape.

18. The method according to claim 15, wherein the bearing portion includes at least one further bump.

19. The method according to claim 18, wherein the at least one further bump is arranged on a side of the bearing portion of the armature, the bearing portion of the armature facing the coil, and/or wherein the at least one further bump at least partially has a spherical shape or spherical cap shape.

20. The method according to claim 15, comprising:
providing a spring for pushing the at least one bump against the coil element or a housing of the tilting armature valve, and wherein the spring is formed as a leaf spring, leg spring or wire bending element.

21. The method according to claim 15, further comprising:
providing a spring for pushing the at least one bump against the coil element or a housing of the tilting armature valve;
wherein the armature is a tilting armature, in which one end includes the sealing element and in which an opposing end includes the bump, wherein the spring faces the opposing end, which includes the bump, of the tilting armature, and wherein the tilting armature extends along a diameter of the coil element.

22. The tilting armature valve according to claim 1, further comprising:
a spring for pushing the at least one bump against the coil element or a housing of the tilting armature valve;
wherein the armature is a tilting armature, in which one end includes the sealing element and in which an opposing end includes the bump, wherein the spring faces the opposing end, which includes the bump, of the tilting armature, and wherein the tilting armature extends along a diameter of the coil element.

* * * * *